United States Patent [19]

Stubbs et al.

[11] Patent Number: 5,016,272

[45] Date of Patent: May 14, 1991

[54] HOME VIDEO SYSTEM

[76] Inventors: James R. Stubbs, 771 Erford Rd., Camp Hill, Pa. 17011; Thomas R. Terry, 4 Mondale Circle, Hummelstown, Pa. 17036

[21] Appl. No.: 367,086

[22] Filed: Jun. 16, 1989

[51] Int. Cl.[5] ............................................. H04N 7/167
[52] U.S. Cl. ......................................... 380/5; 380/15; 380/20; 358/86
[58] Field of Search ................... 380/5, 20, 15; 358/86

[56] References Cited

U.S. PATENT DOCUMENTS

| | | |
|---|---|---|
| 3,278,677 | 10/1966 | Fannoy . |
| 3,654,708 | 4/1972 | Brudner . |
| 4,008,369 | 2/1977 | Theurer et al. . |
| 4,381,522 | 4/1983 | Lambert . |
| 4,450,481 | 5/1984 | Dickinson . |
| 4,461,032 | 7/1984 | Skerlos ..................................... 455/4 |
| 4,506,387 | 3/1985 | Walter . |
| 4,521,806 | 6/1985 | Abraham . |
| 4,567,512 | 1/1986 | Abraham . |
| 4,590,516 | 5/1986 | Abraham . |
| 4,694,490 | 9/1987 | Harvey et al. ........................ 380/20 |
| 4,797,918 | 1/1989 | Lee et al. .............................. 380/20 |
| 4,802,215 | 1/1989 | Mason .................................. 380/20 |
| 4,819,098 | 4/1989 | Ryan ...................................... 380/5 |
| 4,829,569 | 5/1989 | Seth-Smith et al. .................. 380/20 |
| 4,866,770 | 9/1989 | Seth-Smith et al. .................. 380/20 |
| 4,890,320 | 12/1989 | Monslow et al. ....................... 380/5 |

Primary Examiner—Stephen C. Buczinski
Attorney, Agent, or Firm—David B. Newman, Jr., & Associates

[57] ABSTRACT

A home video system comprising a headend system, a transmission channel, a trap, a converter, descrambling equipment, receiving equipment, and requesting equipment. The headend equipment includes program equipment, interface equipment, protection equipment, scrambling equipment, and processor equipment. A transmission channel has a large capacity for a broadcast signal. The broadcast signal includes a plurality of standard signals occupying a first set of channels and a plurality of special signals occupying a second set of channels. The program equipment originates the braodcast signal. The interface equipment is coupled between the program equipment and the transmission channel, and interfaces the broadcast signal from the program equipment with the transmission channel. The protection equipment prevents recording of a first set of special signals. The scrambling equipment scrambles a second set of special signals. The processor tracks pay-per-view subscriber usage of the home video system.

40 Claims, 4 Drawing Sheets

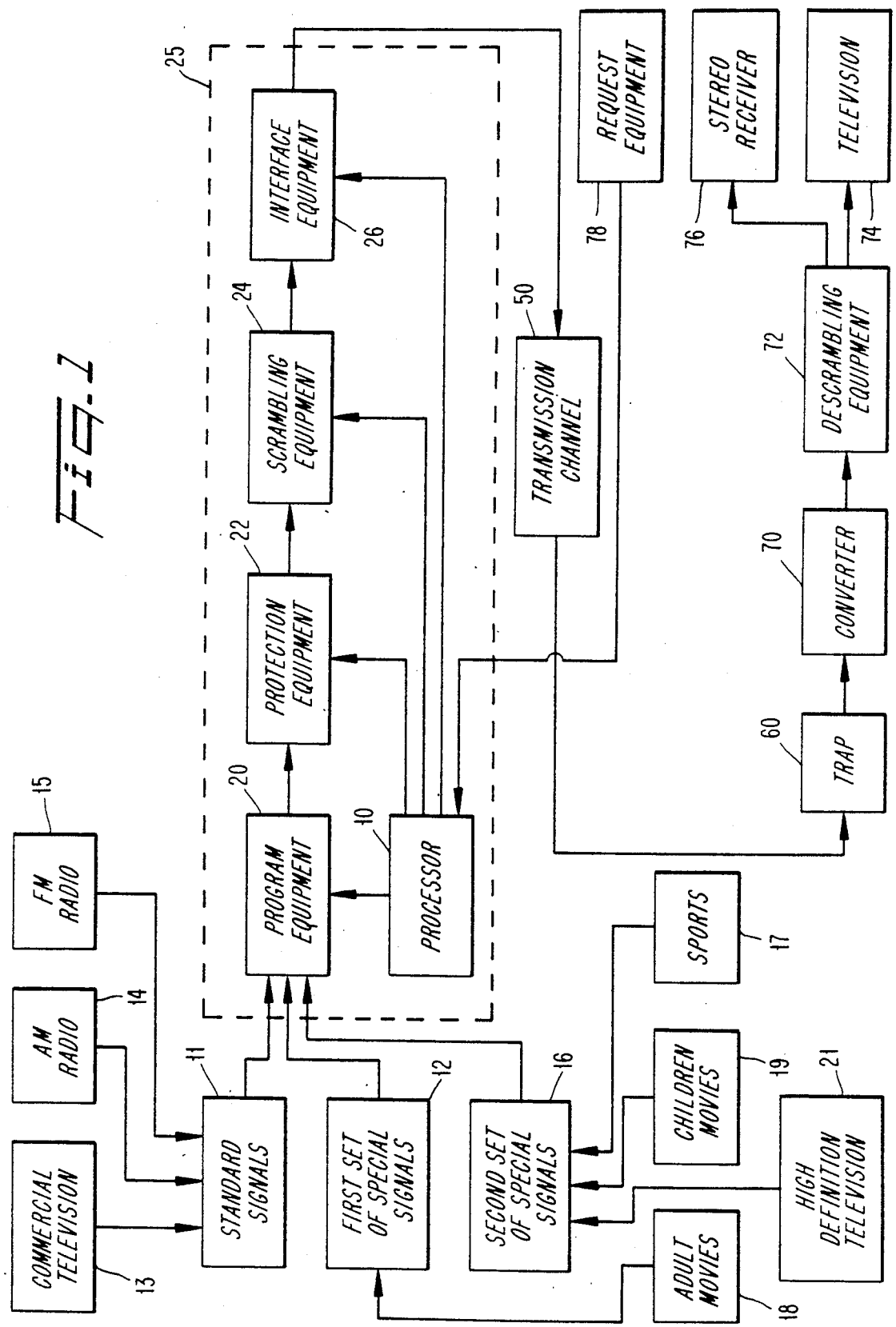

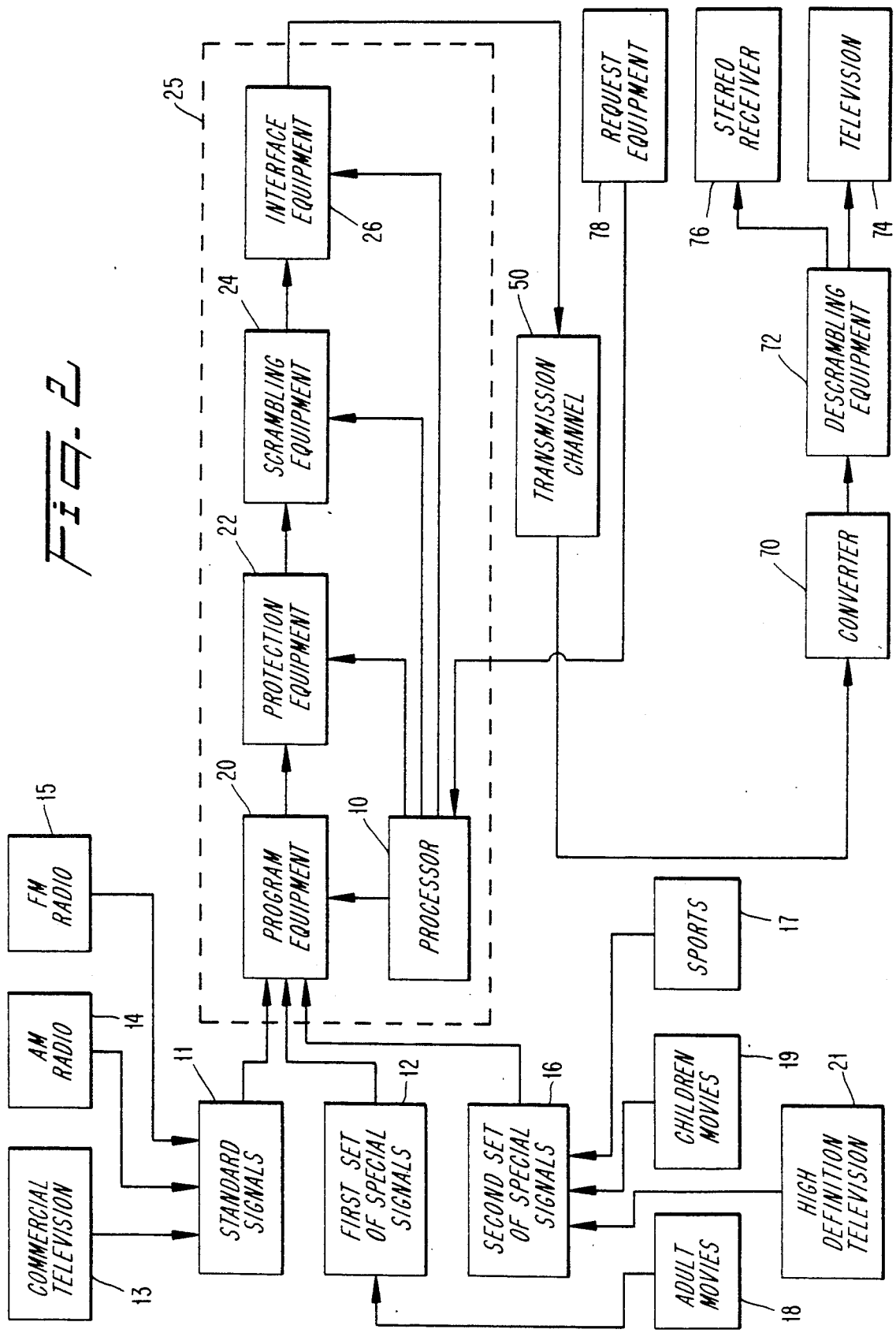

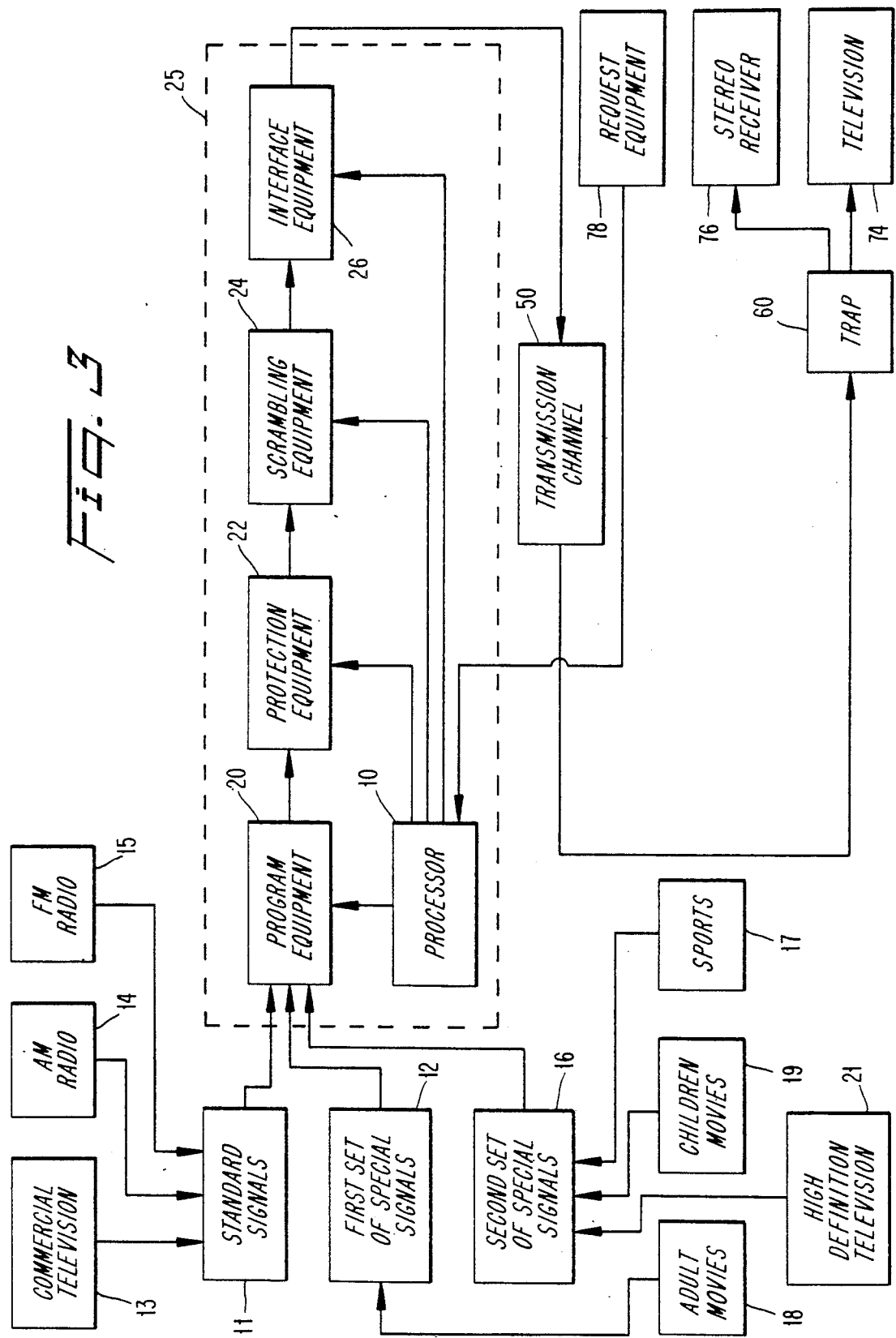

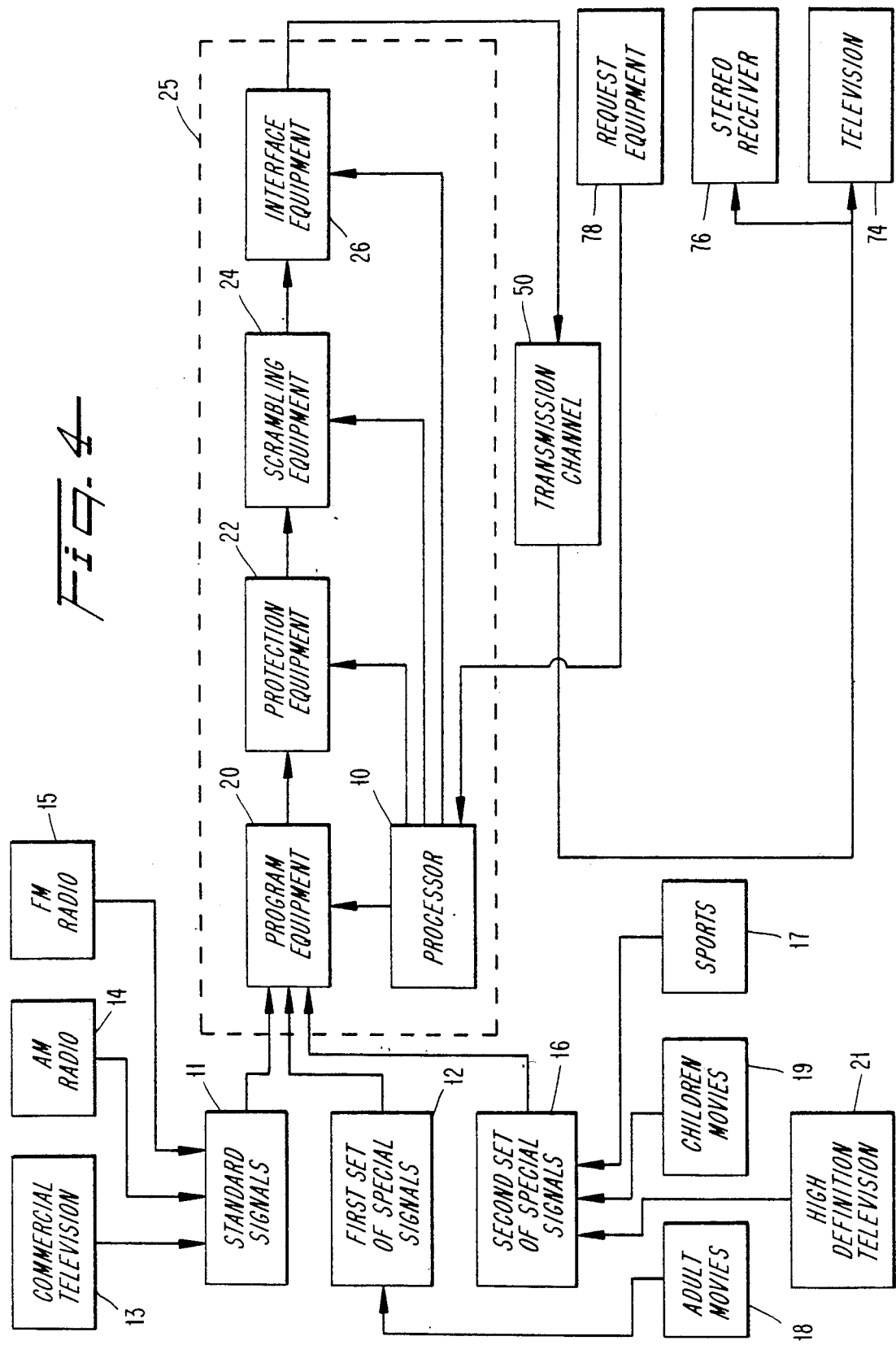

HOME VIDEO SYSTEM

BACKGROUND OF THE INVENTION

The present invention relates to a home video system and more particularly to a system which distributes both free and pay-per-view television signals.

DESCRIPTION OF THE PRIOR ART

Presently, cable subscribers are restricted to limited premium viewing selections by current cable systems or forced to travel to their local video store for expanded selections. Telephone interfaced cable television systems which utilize a subscriber's telephone equipment for program request have been used in the past, but they have not been entirely satisfactory nor simple in operation. Prior art systems generally require the use of multiple dial switching gear, a computer or human operator for controlling and/or processing incoming subscriber telephoned request. Systems are limited to telephoned requests. In addition, prior art systems which utilize signal converters or program channel selectors at the subscriber terminal or location require manual subscriber operation of the converter or selector. Additionally, prior art systems have no methods for protecting the video signal from being taped or recorded at a subscriber end. For example, a subscriber may view a video signal on a cable television system, which may be a premium movie, and video tape the video signal at a substantial loss to the movie producer. Such video taping may violate the movie producer's and owner's copyright. Additionally, prior art systems have not had methods for keeping particular geographic areas of customers from viewing particular television signals. The particular television signals may include adult movie, sports events or other special movies, which for various reasons, a subscriber or subscriber's area might not want viewed nor want to pay for viewing. In addition, other systems make no provision for parental/children authorization of cable signals.

U.S. Pat. No. 4,521,806 to Abraham teaches a subscription service station that has a program library formed by a plurality of recorded audio/video signal sources from which selected program material is broadcast through signal carrier cable or the like to subscriber stations in response to dialing code selection signals transmitted by standard telephone communication. U.S. Pat. No. 4,590,516 to Abraham teaches a recorded program communications systems which provides a communications system for distribution for prerecorded or storage entertainment and information program material by carrier signal transmission to subscribers utilizing conventional receivers such as, but not necessarily limited to, standard television sets. The objects of Abraham '516 and Abraham '806 patents are to generate a system where a subscriber utilizes telephone access to stored programmed material. None of the prior art systems teach or suggest a pay-per-view system with the capability of:

1. Wideband capability, which is not limited to cable, to carry duplicate signals for HDTV, super video format, etc.
2. Video dissemination or protection means for protecting against copyright infringement.
3. Addressable systems including but not limited to telephone addressable link.
4. Parental control access to programming.
5. Economically feasible system suitable for retrofit of existing cable systems and future expansion.
6. Quantity of video signals widely expanded via cable, such as 600 MHz, fiber optic and microwave.

OBJECTS AND SUMMARY OF THE INVENTION

It is an object of the present invention to provide a home video system for transmitting programmed video signals along with off air and satellite signals.

It is another object of the present invention to provide cable subscribers vastly expanded premium programing by retrofitting new and existing cable systems in an economically feasible fashion.

It is another object of the present invention to provide a home video system having a plurality of special signals which may include adult movies, major sporting events, and other special events, on a pay-per-view basis, including duplication of signals to carry HDTV, Super VHS and expanded video formats.

An additional object of the present invention is to provide a home video system, providing for video dissemination methods for protection of transmitted signals, to prevent taping of the signals in violating a copyright of the movie owner.

A still further object of the present invention is to provide a home video system which prevents unauthorized access by state-of-the-art scrambling and descrambling techniques.

According to the present invention, as embodied and broadly described herein, a home video system is provided comprising a headend system, a transmission channel, a trap, a converter, descrambling means, receiving means, and requesting means. The descrambling means may be embodied as descrambling equipment, the receiving means may be embodied as a television or a stereo receiver, and the requesting means may be embodied as request equipment. The headend equipment includes program means, interface means, protection means, scrambling means, and processor means. The program means may be embodied as program equipment, the interface means may be embodied as interface equipment, the protection means may be embodied as protection equipment, the scrambling means may be embodied as scrambling equipment, and the processor means may be embodied as a processor.

The transmission channel has a large capacity for a broadcast signal. The broadcast signal includes a plurality of standard signals and a first and second set of special signals. The first and second set of special signals may include a first and second plurality of subsets of signals, respectively. The first and second sets of special signals may be mutually exclusive or overlapping sets.

The program equipment originates the broadcast signal. The interface equipment is coupled between the program equipment and the transmission channel, and interfaces the broadcast signal from the program equipment with the transmission channel. The protection equipment is coupled between the program equipment and the interface equipment, and prevents recording of the first and second sets of special signals. The scrambling equipment is coupled between the program equipment and the interface equipment, and scrambles a second set of special signals. The processor is coupled to the program equipment and tracks pay-per-view subscriber usage of the home video system.

The trap, which may be an addressable trap, is coupled to the transmission channel and in response to a first code transmitted from the headend system, the trap filters a first block of the first and second sets of special signals, or any block of designated signals. A block includes at least one signal from the first or second set of special signals. The first code includes various codes depending on the particular function to be addressed and controlled. The first block of special signals which is filtered is determined by the first code, which is transmitted from the headend system. The descrambling equipment and the converter may or may not be coupled to the trap and in response to a second code, which is transmitted from the headend system, the converter and the descrambler filters a second block of the first and second sets of the special signals. The second code includes variants depending upon the particular function to be addressed and controlled. The second block of special signals is determined by the particular code transmitted as the second code from the headend system. The addressable trap and regular trap may be used in lieu of a descrambler and converter but there are situations where a trap, converter and descrambler can be used in series. The plurality of standard signals do not require scrambling or trapping.

The descrambling equipment is coupled to the converter and descrambles the second set of special signals, which were scrambled by the scrambling equipment. The television is coupled to the descrambling equipment and the converter and receives the standard signals. The television also receives the first and second set of special signals occupying the first and second blocks of the first and second set of special signals, which may pass through the trap and the converter and descrambler. Thus, traps, descrambler and converters may be used individually or concurrently.

The present invention additionally may include the request equipment which is located at the subscriber with the television. The request equipment can be used to request the reception of a particular special signal. The request equipment typically might be coupled to the processor which in turn keeps track of particular requests and the reception of the particular special signal.

Additional objects and advantages of the invention will be set forth in part in the description which follows, and in part will be obvious from the description or may be learned by practice of the invention.

BRIEF DESCRIPTION OF THE DRAWINGS

The accompanying drawings, which is incorporated in and constitutes a part of this specification, illustrate a preferred embodiment of the invention, and together with the description, serve to explain the principles of the invention.

FIG. 1 is a diagram of a first embodiment of a home video system according to the present invention;

FIG. 2 is a diagram of a second embodiment of a home video system according to the present invention;

FIG. 3 is a diagram of a third embodiment of a home video system according to the present invention; and FIG. 4 is a diagram of a fourth embodiment of a home video system according to the present invention.

DETAILED DESCRIPTION OF THE PREFERRED EMBODIMENTS

Reference will now be made to the present embodiments of the invention, examples of which are illustrated in the accompanying drawing, wherein like reference numerals indicate like elements throughout the several views.

Referring to FIG. 1, a preferred embodiment of a home video system is shown comprising a headend system 15, a transmission channel 50, a trap 60, a converter 70, descrambling means, receiving means, and requesting means. The descrambling means, the receiving means, and requesting means, may be embodied as descrambling equipment 72, television 74 or stereo receiver 76, and request equipment 78, respectively. The transmission channel 50 has a large capacity for a broadcast signal. The broadcast signal includes a plurality of standard 11 signals and a first and second set of special signals 12,16. The first and second set of special signals 12,16 may include a first and second plurality of subsets of signals. The first and second sets of special signals 12,16 may be mutually exclusive or overlapping sets.

In the exemplary arrangement shown, the headend system 15 includes program means, interface means, protection means, scrambling means, and processor means. The program means may be embodied as program equipment 20, the interface means may be embodied as interface equipment 26, the protection means may be embodied as protection equipment 22, the scrambling means may be embodied as the scrambling equipment 24, and the processor means may be embodied as the processor 10.

The program equipment 20 originates the broadcast signal. The protection equipment 22 is coupled between the program equipment 20 and the interface equipment 26. The protection equipment 22 prevents recording of a first and/or second set of special signals 12,16. The scrambling equipment 24 is coupled between the program equipment 20 and the interface equipment 26. The scrambling equipment 24 scrambles a second set of special signals 16.

The interface equipment 26 is coupled between the program equipment 20 and the transmission channel 50. The interface equipment interfaces the broadcast signal transmitted from the program equipment 20 with the transmission channel 50. The processor 10 is coupled to the program equipment 20, and tracks pay-per view subscriber usage of the home video system.

The trap 60 is coupled to the transmission channel 50. In response to a first code transmitted from the headend system 15, the trap 60 selectively filters signals form among a first block of the first and second sets of the special signals 12,16 or any designated signals occupying the capacity of the transmission channel 50. The first code may be any of the various codes used by the home video system, depending upon the function to be addressed and controlled.

The converter 70 is coupled to the transmission channel 50. In response to a second code transmitted from the headend system 15, the converter 70 selectively filters signals from among a second block of the first and second sets of the special signals 12,16 or any designated signals occupying the capacity of the broadcast signal in the transmission channel. The second code may be any of the various codes used by the home video system, depending upon the function to be addressed and controlled.

The descrambling equipment 72 is coupled to the converter 70. The descrambling equipment 72 descrambles the second set of special signals, which were scrambled by scrambling equipment 24.

The television 74 and stereo receiver 76 are illustrative only, as examples of what could be used for receiving equipment for the home video system. For this particular example, the television 74 and stereo receiver 76 are coupled to the descrambling equipment 72 and to the converter 70 or to the trap 60. The trap 60 may be either an addressable or nonaddressable trap. The television 74 and stereo receiver 76 receive the standard signals signals form among and the first and second blocks of the first and second set of special signals 12,16 which pass through the trap 60, descrambler 72 and the converter 70 of FIGS. 1 and 3. The particular signals which pass through the trap 60, converter 70 and/or descrambler 72 are those which were filtered by the trap 60, converter 70 and/or descrambler 72 filtering function.

Located at the television receiver 74 or stereo receiver 76 is request equipment 78. The request equipment 78 is coupled to the headend system 15, and more particularly to the processor 10. The request equipment 78 is for requesting the reception of a particular special signal from the headend equipment 15. The request equipment 78 may be coupled to the headend system 15 through an independent channel, or through transmission channel 50, which may be a bidirectional transmission channel. The bidirectional transmission channel may be located in the lower 50 MHz of the transmission channel 50. An independent channel may be, for example, the transmission channel 50, or the telephone lines as found in a normal, ordinary household or by other means.

In operation, the program equipment 20 broadcasts a plurality of standard signals 11 which may include commercial broadcast television signals 13. Commercial broadcast television signals 13 normally would not need to pass through the protection equipment 22 and scrambling equipment 24. Instead, the standard signals would pass directly from the program equipment 20 through the interface equipment 26 and the transmission channel 50, trap 60, converter 70, descrambler 72 to television 74 or stereo receiver 76. Normally, there would be no charge for commercial broadcast signals including television 13 or stereo radio 14,15. Accordingly, the processor 10 would not track the user and use of the standard signals or special signals that do not require tracking.

The home video system also includes the capability of transmitting a plurality of special signals emanating from a video tape, compact disk, compact interactive disk or other means, of a movie which the owner of the home video system would not want to have the user at the receiver end, with television 74, video recording. The protection equipment, using dissemination methods such as distorting the synchronization pulse signal, would allow a special signal to be viewed from a television 74, but not passed on to a conventional video recorder such as a tape recorder, compact interactive disk or other means. Such method provides protection from copying of the first and second subset of special signals.

The second set of special signals is scrambled by scrambling equipment 24, and descrambled by descrambling equipment 72. The scrambling equipment 24 and descrambling equipment 72 prevent unauthorized access to the second set of special signals. This may ensure, for example, that the second set of special signals not be viewed at certain television 74 locations.

The present invention uses trap 60 as a filter which has logic for receiving and responding to a first code transmitted from the headend system 15. The trap 60 may be located in a particular geographical area or at each subscriber location. There may be also locations where nonaddressable traps are used. The trap 60, in response to receiving the first code transmitted from the headend system, will allow signals from among a first block of signals to pass through the trap to a particular geographical area. Trap 60 may be used, for example, in an area where there are dormitories for children wherein it is desired that they not have access to a particular block of signals from the home video system, headend system 15. The converter 70 and descrambler 72 independently may provide this function, as shown in FIG. 2. FIG. 3 illustrates an alternate configuration for the location of trap 60.

The converter 70 and descrambler 72 are responsive to a second code transmitted from the headend system 15 and filters signals from among a second block of the first and second sets of the special signals. The second code includes variants or multiple codes depending upon the function to be accomplished. The second code may be originated from processor 10, in response to a request from request equipment 78 that a particular special signal be received from the headend system 15. This might be found, for example, where a user at the location of television 74 requests the reception of a particular signal from the headend system 15.

The home video system of the present invention will enable current and future cable systems to greatly expand programming and revenue by adding a large variety of unique video signals to the normal channel selection. This system will be directly competitive with the movie rental stores but will allow for security protection and for compensation to the copyright holders.

Unique programming of the home video system includes programmed video tapes, compact disk, compact interactive disk, and other means, and special events by pay-per-view signals, which are represented as the special signals of the present invention. All signals of the present invention would be transmitted by a state-of-the-art channel cable transmission system. The cable transmission system may have, for example, 100 channels. All 100 channels would be received by each subscriber.

The present invention further has the advantage and capability of transmitting program video signals along with off air and satellite signals. Program equipment 20 includes professional grade video cassette recorders, compact disk, compact interactive disk, and other equipment for originating the video signals transmitted to the viewer on a scheduled basis. Program equipment 20 also includes means coupled to commercial television signals for relaying over the transmission channel 50.

The transmission channel 50, which may be bidirectional, uses a state-of-the-art medium for allowing transmission of approximately 100 cable channels. This technology can be applied to new and retrofitted systems using midsplit/subsplit techniques along with wide bandwidth technology, such as 600 megahertz. The transmission channel 50 also may use fiber optic or microwave transmission systems with more expanded channel capacity.

The program equipment 20 can transmit conventional television stations 13 as the plurality of standard signals 11, which might be allocated to the first 20 channels of the transmission channel. The standard signals 11 may be transmitted over a transmission channel without using any of the equipment required for the special signals, as shown in FIG. 4. The remaining channels of the transmission channel 50 can be allocated to home video systems which would be included in the plurality of special signals occupying a first and second set of channels. As an example, scheduling may allow for the transmission of eighty video signals every two hours or forty video signals every hour. The special signals may include adult movies 18, major sporting and other special events 17,19, and a pay-per view system. The first code for controlling the trap 60 or the second code for controlling the converter 70 and descrambler 72 can be used to control who watches the first and second set of special signals, which may include preventing adult movies from view of children or subscribers who do not want those signals. The home video system of the present invention may also have a child prevented from viewing feature wherein a subscriber would have to enter a special code in converter 70, descrambler 72 or request equipment 78 to view special channels such as adult movies.

The present invention has an advantage of also having a large capacity and therefore the capability of transmitting high definition television signals (HDTV) 21, super VHS and other special signals. Thus, high definition television 21 signals which may be included as part of the special signals occupying the first and second set of special signals, can be transmitted over transmission channel 50, and ultimately to television 74.

Protection of transmitted special signals is accomplished in the present invention by using the protection equipment 22 which will prevent the transmitted video signals from being recorded at the television 74. Protection also includes the capability to prevent unauthorized access of a first and second set of special signals by using scrambling equipment 24 and descrambling equipment 72. The processor 10 will be capable of monitoring which viewer at location of television 74 has access to the first and second set of special signals, which may include multiple subsets of special signals, passing through trap 60 first and second set of special signals, which may include multiple subsets of special signals, passing through converter 70. Thus, the home video system will be capable of monitoring special signals viewed by individual subscribers and keep an update database on their viewing as may be required by copyright holders. This will allow the home video system to track and charge on a pay-per-view basis as to which channels and special signals a particular subscriber wishes to watch.

The present invention includes means for transmitting the standard signals and special signals from a first headend system to a second headend system or plurality of headend systems. The functions previously described can apply to each headend system but all the functions or apparatus are not necessary for each headend system.

It will be apparent to those skilled in the art that various modifications can be made to the home video system of the present invention without departing from the scope or spirit of the present invention and it is intended that the present invention cover modifications and variations of the home video system provided they come within the scope of the appended claims and their equivalents.

We claim:

1. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:
    a cable serving as a transmission channel having a large capacity for the plurality of standard signals and the first and second set of special signals;
    a headend system including,
        program means for originating the plurality of standard signals and the first and second set of special signals;
        interface means coupled between said program means and said cable for interfacing the plurality of standard signals and the first and second set of special signals from said program means with said cable;
        protection means coupled between said program means and said interface means for distorting the synchronization pulse signal of the first set and second set of the special signals for preventing recording of the first set and second set of the special signals while allowing direct use of the received signals by each subscriber;
        scrambling means coupled between said program means and said interface means for scrambling the second set of the special signals;
        processor means coupled to said program means for tracking pay-per-view subscribed usage;
    a trap coupled to said cable and responsive to a first code transmitted from said headend system for filtering signals from among a first block of the first and second sets of the special signals;
    a converter coupled to said trap and responsive to a second code transmitted from said headend system for filtering signals from among a second block of the first and second sets of special signals;
    means coupled to said converter for descrambling signals from among the second set of special signals;
    means coupled to said descrambling means and said converter for receiving the standard signals and signals from among the first and second block of the first and second sets of special signals passing through said trap and said converter; and
    means located at said receiving means and coupled to said headend system for requesting the reception of a particular special signal.

2. The home video system as set forth in claim 1 wherein said receiving means is a conventional television set.

3. The home video system as set forth in claim 1 wherein said program means is means for recording video signals.

4. The home video system as set forth in claim 1 wherein said processor means is a computer.

5. The home video system as set forth in claim 1 wherein the standard signals include broadcast television and radio signals.

6. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:

a cable serving as a transmission channel for the plurality of standard signals and the first and second set of special signals;
a headend system including,
program means for originating the plurality of standard signals and the first and second set of special signals;
interface means coupled between said program means and said cable for interfacing the plurality of standard signals and the first and second set of special signals from said program means with said cable;
scrambling means coupled between said program means and said interface means for scrambling the second set of the special signals while allowing direct use of the received signals by each subscriber;
processor means coupled to said program means for tracking pay-per-view subscriber usage;
a trap coupled to said cable and responsive to a first code transmitted from said headend system for filtering signals from among a first block of the first and second sets of special signals;
a converter coupled to said trap and responsive to a second code transmitted from said headend system for filtering signals from among a second block of the first and second sets of the special signals;
means coupled to said converter for descrambling signals form among the second set of the special signals;
means coupled to said descrambling means and said converter for receiving the standard signals and the first and second blocks of the first and second sets of special signals passing through said trap and said converter; and
means located at said receiving means and coupled to said headend system for requesting the reception of a particular special signal.

7. The home video system as set forth in claim 6 wherein said receiving means is a conventional television set.

8. The home video system as set forth in claim 6 wherein said program means is means for recording video signals.

9. The home video system as set forth in claim 6 wherein said processor means is a computer.

10. The home video system as set forth in claim 6 wherein the standard signals include broadcast television and radio signals.

11. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:
a cable serving as a transmission channel for the plurality of standard signals and the first and second set of special signals;
a headend system including,
program means for originating the plurality of standard signals and the first and second set of special signals;
interface means coupled between said program means and said cable for interfacing the plurality of standard signals and the first and second set of special signals from said program means with said cable;
protection means coupled between said program means and said interface means for distorting the synchronization pulse signal of the first set of the special signals while allowing direct use of the received signals by each subscriber;
processor means coupled to said program means for tracking pay-per-view subscribed usage;
a trap coupled to said cable and responsive to a first code transmitted from said headend system for filtering signals from among a first block of the first set of special signals;
a converter coupled to said trap and responsive to a second code transmitted from said headend system for filtering signals from among a second block of the first set of special signals;
means coupled to said converter for receiving the standard signals and signals from among the first and second blocks of the first set of special signals passing through said trap and said converter; and
means located at said receiving means and coupled to said headend system for requesting the reception of a particular special signal.

12. The home video system as set forth in claim 11 wherein said receiving means is a conventional television set.

13. The home video system as set forth in claim 11 wherein said program means is means for recording video signals.

14. The home video system as set forth in claim 11 wherein said processor means is a computer.

15. The home video system as set forth in claim 11 wherein the standard signals include broadcast television and radio signals.

16. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:
a cable serving as a transmission channel for the plurality of standard signals and the first and second set of special signals;
a headend system including,
program means for originating the plurality of standard signals and the first and second set of special signals;
interface means coupled between said program means and said cable for interfacing the plurality of standard signals and the first and second set of special signals from said program means with said cable;
protection means coupled between said program means and said interface means for distorting the synchronization pulse signal of the first set of the special signals;
scrambling means coupled between said program means and said interface means for scrambling the second set of the special signals while allowing direct use of the received signals by each subscriber;
processor means coupled to said program means for tracking pay-per-view subscriber usage;

a converter coupled to said transmission channel and responsive to a second code transmitted from said headend system for filtering signals from among a block of the first and second set of the special signals;

means coupled to said converter for descrambling the second set of special signals;

means coupled to said descrambling means and said converter for receiving the standard signals and signals from among the block of the first and second set of special signals passing through said converter; and means located at said receiving means and coupled to said headend system for requesting the reception of a particular special signal.

17. The home video system as set forth in claim 16 wherein said receiving means is a conventional television set.

18. The home video system as set forth in claim 16 wherein said program means is means for recording video signals.

19. The home video system as set forth in claim 16 wherein said processor means is a computer.

20. The home video system as set forth in claim 16 wherein the standard signals include broadcast television and radio signals.

21. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:

a cable serving as a transmission channel for the plurality of standard signals and the first and second set of special signals;

a headend system including, program means for originating the plurality of standard signals and the first and second set of special signals;

interface means coupled between said program means and said cable for interfacing the plurality of standard signals and the first and second set of special signals from said program means with said cable;

protection means coupled between said program means and said interface means for distorting the synchronization pulse signal of the first set of the special signals while allowing direct use of the received signals by each subscriber;

scrambling means coupled between said program means and said interface means for scrambling the second set of the special signals;

processor means coupled to said program means for tracking pay-per-view subscriber usage;

a trap coupled to said cable and for filtering signals from among a first block of the first and second sets of special signals;

means coupled to said trap for descrambling the second set of special signals;

means coupled to said descrambling means and said trap for receiving the standard signals and signals from among the block of the first and second set of special signals passing through said trap; and means located at said receiving means and coupled to said headend system for requesting the reception of a particular special signal.

22. The home video system as set forth in claim 21 wherein said receiving means is a conventional television set.

23. The home video system as set forth in claim 21 wherein said program means is means for recording video signals.

24. The home video system as set forth in claim 21 wherein said processor means is a computer.

25. The home video system as set forth in claim 21 wherein the standard signals include broadcast television and radio signals.

26. The home video system as set forth in claim 21 wherein the said trap is responsive to a first code transmitted from said headend system for filtering the block of the first and second sets of special signals.

27. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:

a cable serving as a transmission channel for the plurality of standard signals and the first and second set of special signals;

a headend system including, program means for originating the plurality of standard signals and the first and second set of special signals;

interface means coupled between said program means and said cable for interfacing the plurality of standard signals and the first and second set of special signals from said program means with said cable;

processor means coupled to said program means for tracking pay-per-view subscriber usage;

a trap coupled to said cable and for filtering signals from among a block of the first and second sets of special signals;

means coupled to said trap for receiving the standard signals and signals from among the block of the first and second set of special signals passing through said trap and said converter; and means located at said receiving means and coupled to said headend system for requesting the reception of a particular special signal.

28. The home video system as set forth in claim 27 wherein said receiving means is a conventional television set.

29. The home video system as set forth in claim 27 wherein said program means is means for recording video signals.

30. The home video system as set forth in claim 27 wherein said processor means is a computer.

31. The home video system as set forth in claim 27 wherein the standard signals include broadcast television and radio signals.

32. The home video system as set forth in claim 27 wherein the said trap is responsive to a first code transmitted from said headend system for filtering the block of the first and second sets of special signals.

33. A home video system for use by a headend transmitting simultaneously a plurality of standard signals including audio and video signals, and a first set and a second set of special signals including audio and video signals, to allocate a predetermined combination of services selected from a plurality of more than two different services, each including at least video and audio services, to selected blocks of a plurality of users, comprising:

a cable serving as a transmission channel for the plurality of standard signals and the first and second set of special signals;

a headend system including, program means for originating the plurality of standard signals and the first and second set of special signals;

interface means coupled between said program means and said cable for interfacing the plurality of standard signals and the first and second set of special signals from said program means with said cable;

processor means coupled to said program means for tracking pay-per-view subscriber usage;

means coupled to said transmission channel for receiving the standard signals and the set of special signals; and means located at said receiving means and coupled to said headend system for requesting the reception of a particular special signal.

34. The home video system as set forth in claim 33 wherein said receiving means is a conventional television set.

35. The home video system as set forth in claim 33 wherein said program means is means for recording video signals.

36. The home video system as set forth in claim 33 wherein said processor means is a computer.

37. The home video system as set forth in claim 33 wherein the standard signals include broadcast television and radio signals.

38. The home video system as set forth in claim 1, 6, 11, 16, 21, 27, or 33 wherein said cable includes fiber optic cable.

39. The home video system as set forth in claim 1, 6, 11, 16, 21, 27, or 33 wherein said cable includes a large capacity media.

40. The home video system as set forth in claim 1, 6, 11, 16, 21, 27, or 33 wherein said transmission channel includes a microwave link.

* * * * *